UNITED STATES PATENT OFFICE 2,593,400

FIREPROOFING COMPOSITIONS

Jules J. Rakos, Beyoglu-Istanbul, Turkey

No Drawing. Application October 5, 1948,
Serial No. 52,975

2 Claims. (Cl. 106—15)

This invention relates to fireproofing compositions. An example of the use of the composition is as a coating or paint for inflammable materials such as wood.

An important object of the invention is to provide a fireproofing composition which may be applied to wood as readily as is ordinary paint and does not streak, creep, crack nor peel.

Another important object is to provide such a composition which resists hot, persistent flames, such as those of burning gasoline.

Still another important object is to provide a fireproofing composition which is economical to manufacture, requires no heat treatment in its compounding and may be applied as are ordinary paints, such as by brushing.

Other objects and advantages of the invention will be apparent during the course of the following detailed description of my invention.

In preparing my fireproof composition I employ the following, percentages being by weight:

| | Per cent |
|---|---|
| Sodium silicate | 48 to 60 |
| Trisodium phosphate | 20 to 25 |
| Lithopone | 20 to 25 |
| Quartz | 10 to 15 |
| Sodium hydroxide | 1 |
| Deterioration and insect inhibitor | 1 to 2 |
| Pigment | 1 to 2 |

The quartz is preferably in a finely divided condition, as ground, the deterioration and insect inhibitor is either formaldehyde or a chloro phenol, or both, and the pigment is, preferably, a suitable oxide as the lead or iron oxides.

In preparing the fireproofing composition, substantially 1% sodium hydroxide is carefully introduced to 6% to 10% of the sodium silicate in a suitable mixer, as a conventional centrifuge mixer and mixing continued until the reaction is completed. The reaction product (a liquid) is then introduced to the remaining sodium silicate in a conventional centrifuge mixer and mixing continued for at least one hour. Thereupon, the preferably finely divided quartz is introduced to the last mixture and mixing continued for substantially two hours, following which the formaldehyde and/or chloro phenol is added and mixing continued for approximately one hour. The mixture is then introduced, with the pigment, to a suitable conventional paint mixing machine and mixing continued until the pigment is evenly distributed throughout the mixture. The composition thus obtained is the new fireproofing composition, minus the lithopone which is added as subsequently explained, and it may be poured into cans or drums for marketing.

In using the new composition, the surface to which the same is to be applied should be clean and dry, and the composition treated with a suitable weight of lithopone. For example, from 250 to 300 grams lithopone and 1 kilogram of the composition are thoroughly mixed and the composition is then ready for application to the material to be fireproofed. A stiff brush may be employed. Of course a second application may be made after the first has dried. The surface of the applied composition should be protected from water until dry.

I am aware of the use of silicates, including sodium silicate, in fireproofing compositions, and of the action of sodium hydroxide on sodium silicate, but I have discovered that, by the employment of critical proportions of sodium silicate, as stated, with a critical proportion of the hydroxide and, following the two steps described for the incorporation of the silicate into the composition, I am able to provide a fireproofing or flameproofing composition which does not flake nor peel when exposed to flame or high temperatures over an extended period (although there may be some minor blistering). For example, tests conducted in the United States, employing my new fireproofing composition, included painting one-half of each of several wooden crates (conventional orange crates) with my composition, then dousing them with gasoline and setting fire thereto resulted, after substantially 30 minutes of fire, in the unpainted halves of the crates being consumed while the painted halves were unburned and intact, although somewhat blistered. These tests were made under the eyes of fire wardens of one of Ohio's larger cities. In Turkey, tests were conducted and, for example, one included setting fire to like combustible material within two identical frame sheds, except that one shed was coated with my new composition. After six minutes the uncoated shed was substantially destroyed while the coated one showed only minor blistering of the coating composition both inside and out. Not only was the coated shed unburned but, right after the test, the wood was but slightly warm to the touch.

The trisodium phosphate and quartz provide body and filler. Obviously, I may employ other well-known insecticides other than the chlorophenols and other well known preservatives than formaldehyde, both without invention.

I am aware of the use of lithopone as a paint pigment but this use entails the employment of only minor proportions of the same. For example, in the French Patent 834,997 to Konrad, there is employed 10 parts of lithopone in 100 parts of fireproofing composition and this appears to be the maximum proportion of which I have knowledge.

However, in my final composition, the proportion of lithopone is a major proportion (exceeded only by sodium silicate). In the proportions named, there is obtained more than a pigment, in that the lithopone aids in providing fireproofing against the persistent type of flame such as kindled by gasoline and aids in preventing cracking and peeling of the coating, when subjected to gasoline flame, for example.

The new composition requires no heat treatment in its manufacture, hence there is a saving in manufacturing costs.

While the new composition may be employed as a coating composition, it is apparent that it may used to inpregnate absorbent materials such as cloth, paper and the like.

What is claimed is:

1. A fireproofing coating composition useful in protection against persistent types of flame, such as gasoline flame, comprising 48% sodium silicate, 20% trisodium phosphate, 20% lithopone, 10% finely divided quartz, 1% formaldehyde, and 1% sodium hydroxide, said percentages being by weight, said composition being characterized by its anti-flaking and anti-peeling qualities when a dried film of said composition is exposed to flame of high temperature, such as gasoline flame.

2. A fireproofing coating composition useful in protection against persistent types of flame, such as gasoline flame, comprising 48% sodium silicate, 20% trisodium phosphate, 20% lithopone, 10% finely divided quartz, 1% sodium hydroxide, and the remaining 1% being composed of formaldehyde and iron oxide, said percentages being by weight, said composition being characterized by its anti-flaking and anti-peeling qualities when a dried film of said composition is exposed to flame of high temperature, such as gasoline flame.

JULES J. RAKOS.

REFERENCES CITED

The following references are of record in the file of this patent:

UNITED STATES PATENTS

| Number | Name | Date |
|---|---|---|
| 1,983,498 | Lux | Dec. 4, 1934 |
| 2,187,622 | Koerner | Jan. 16, 1940 |
| 2,232,162 | Boller | Feb. 18, 1941 |
| 2,449,346 | Vannoy | Sept. 14, 1948 |